US009241297B2

(12) United States Patent
Kong et al.

(10) Patent No.: US 9,241,297 B2
(45) Date of Patent: Jan. 19, 2016

(54) METHOD AND APPARATUS FOR PROVIDING LOCAL BREAKOUT SERVICE IN WIRELESS COMMUNICATION SYSTEM

(75) Inventors: Dong-Keon Kong, Suwon-si (KR); Jung-Shin Park, Seoul (KR); Ji-Cheol Lee, Suwon-si (KR); Nae-Hyun Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 967 days.

(21) Appl. No.: 12/883,517

(22) Filed: Sep. 16, 2010

(65) Prior Publication Data

US 2011/0069659 A1 Mar. 24, 2011

(30) Foreign Application Priority Data

Sep. 18, 2009 (KR) .................. 10-2009-0088350
Sep. 9, 2010 (KR) .................. 10-2010-0088180

(51) Int. Cl.
*H04W 8/08* (2009.01)
*H04W 48/06* (2009.01)
*H04W 84/04* (2009.01)

(52) U.S. Cl.
CPC ............ *H04W 48/06* (2013.01); *H04W 84/045* (2013.01)

(58) Field of Classification Search
CPC ... H04W 84/045; H04W 8/082; H04W 80/04; H04W 88/16; H04W 8/26; H04W 12/06; H04L 45/304; H04L 61/2015
See application file for complete search history.

(56) References Cited

U.S. PATENT DOCUMENTS

| 8,089,400 | B1* | 1/2012 | Fang et al. ............... 342/357.42 |
| 8,295,830 | B1* | 10/2012 | Faccin ..................... 455/432.1 |
| 2008/0259873 | A1 | 10/2008 | Ahmavaara et al. |
| 2008/0270274 | A1* | 10/2008 | Mo et al. ..................... 705/34 |
| 2008/0285492 | A1 | 11/2008 | Vesterinen |
| 2009/0080374 | A1* | 3/2009 | Lee et al. .................... 370/328 |
| 2009/0232019 | A1* | 9/2009 | Gupta et al. ................. 370/252 |
| 2010/0054208 | A1* | 3/2010 | Kojima ....................... 370/331 |
| 2010/0128709 | A1* | 5/2010 | Liu .................... H04W 36/0022 370/338 |

(Continued)

FOREIGN PATENT DOCUMENTS

CN WO2009021422 * 2/2009
WO 2008/110215 A1 9/2008

OTHER PUBLICATIONS

"WiMAX Forum Network Architecture Stage 3: Detailed Protocols and Procedures". Release 1.0 Version 4. Feb. 3, 2009.*

*Primary Examiner* — Gregory Sefcheck
*Assistant Examiner* — Jenkey Van
(74) *Attorney, Agent, or Firm* — Jefferson IP Law, LLP

(57) ABSTRACT

A method and an apparatus for providing a Local BreakOut (LBO) service in a wireless communication system are provided. In the method for providing an LBO service in a wireless communication system, after an access authentication procedure between an authentication server and a terminal, a femto gateway receives a subscriber profile including LBO service flow information from the authentication server to provide the LBO service flow information to a femto base station through initial service flow setting between the terminal and the femto gateway. The femto base station sets an LBO service flow through a Dynamic Service Addition (DSA) procedure. The terminal performs a Dynamic Host Configuration Protocol (DHCP) procedure through the LBO service flow setting, and obtains an IP address for LBO based on the DHCP procedure.

41 Claims, 8 Drawing Sheets

(56) References Cited

U.S. PATENT DOCUMENTS

2010/0195621 A1* 8/2010 Kekki et al. .................. 370/332

2011/0176531 A1* 7/2011 Rune .................. H04W 76/041
370/338

* cited by examiner

METHOD AND APPARATUS FOR PROVIDING LOCAL BREAKOUT SERVICE IN WIRELESS COMMUNICATION SYSTEM

PRIORITY

This application claims the benefit under 35 U.S.C. §119 (a) of a Korean patent application filed in the Korean Intellectual Property Office on Sep. 18, 2009 and assigned Serial No. 10-2009-0088350 and a Korean patent application filed in the Korean Intellectual Property Office on Sep. 9, 2010 and assigned Serial No. 10-2010-0088180, the entire disclosure of which is hereby incorporated by reference.

BACKGROUND OF THE INVENTION

1. Field of the Invention

The present invention relates to a broadband wireless communication system that supports a femto base station. More particularly, the present invention relates to a system structure and a method for providing a Local BreakOut (LBO) service when a terminal uses a femto base station.

2. Description of the Related Art

A femto cell denotes a cell in a cellular system that covers a very small service area such as a household or an office, and a base station that services the femto cell is called a femto base station. The femto base station is an ultra small base station that accesses a mobile communication core network via a broadband network installed in an indoor space such as a household or an office, and operates with low power. The femto base station provides various advantages such as extending the cellular coverage indoors, improving communication quality, and efficiently providing various wired/wireless fusion services. In addition, the femto base station provides many advantages for a subscriber and related service providers. For user convenience, handover for voice/data service between macro or femto cells should be guaranteed, and control of user access by an access control should be possible. In addition, differentiated charging/accounting alternatives according to a femto cell-based service scenario and reliable data should be provided.

A $3^{rd}$ Generation Partnership Project (3GPP) group defines a Wideband Code Division Multiple Access (WCDMA)-based Home Node B (HNB) and a Long Term Evolution (LTE)-based Home evolved Node B (Home eNB) as a femto base station. In addition, the Institute of Electrical and Electronics Engineers (IEEE) 802.16 standard calls a femto base station a WiMAX Access Point, and defines a network for a femto cell.

Currently, traffic of a terminal inside a femto cell is transmitted via a transmission path of a mobile communication service provider network. Therefore, data of all terminals in a femto cell should be transmitted via a transmission path of the mobile communication service provider network. That is, all Internet traffic occurring in hundreds of thousands to millions of femto base stations is transferred to an Internet network via a femto gateway of the mobile communication service provider. Based on this substantial amount of traffic, a femto service provider needs to operate a large-capacity femto gateway and a large-capacity core network that can process all traffic occurring in femto base stations. This acts as a factor that increases Capital expenditures (Capex) and Operational expenditures (Opex) of a service provider. In addition, in the case in which an existing macro network service provider intends to provide a femto service using an Access Service Network-GateWay (ASN-GW) of a macro system, a problem of having to increase the capacity of a macro core network occurs.

Therefore, a method and an apparatus for preventing a load from being concentrated on a femto gateway in a wireless communication system that supports a femto base station are required.

SUMMARY OF THE INVENTION

An aspect of the present invention is to address at least the above-mentioned problems and/or disadvantages and to provide at least the advantages described below. Accordingly, an aspect of the present invention is to provide a method and an apparatus for preventing a load from being concentrated on a femto gateway in a wireless communication system that supports a femto base station.

Another aspect of the present invention is to provide a method and an apparatus for providing a Local BreakOut (LBO) service to a terminal in a wireless communication system that supports a femto base station.

In accordance with an aspect of the present invention, a method for operating a femto gateway to provide an LBO service in a wireless communication system is provided. The method includes, after an access authentication process between an authentication server and a terminal, receiving a subscriber profile including LBO service flow information from the authentication server, after setting an initial service flow between the terminal and the femto gateway, providing the LBO service flow information to a femto base station, and receiving information informing that an LBO service flow has been successfully set from the femto base station.

In accordance with another aspect of the present invention, a method for operating a femto base station to provide an LBO service in a wireless communication system is provided. The method includes, when receiving LBO service flow information from a femto gateway, transmitting a Dynamic Service Addition (DSA) request message including an LBO service indicator to a terminal in order to set an LBO service flow, after receiving a DSA response message from the terminal, transmitting a DSA ACK message to the terminal, and allocating an Internet Protocol (IP) address for an LBO service to the terminal through a Dynamic Host Configuration Protocol (DHCP) procedure.

In accordance with still another aspect of the present invention, a method for operating a terminal to provide an LBO service in a wireless communication system is provided. The method includes setting a femto gateway and an initial service flow to obtain a first IP address, after setting the initial service flow, receiving a DSA request message including an LBO service indicator from a femto base station, transmitting a DSA response message for the DSA request message to the femto base station, and receiving a DSA ACK message for the DSA response message from the femto base station, and, after setting an LBO service flow, obtaining a second IP address.

In accordance with still yet another aspect of the present invention, a method for providing an LBO service in a wireless communication system is provided. The method includes setting, at a femto gateway, an initial service flow and allocating a first IP address to a terminal, after setting the initial service flow, setting, at a femto base station, an LBO service flow information-based LBO service flow to allocate a second IP address to the terminal, and transmitting, at the terminal, traffic using at least one of the first IP address and the second IP address.

In accordance with yet another aspect of the present invention, a femto gateway for providing an LBO service in a wireless communication system is provided. The femto gateway includes a controller for receiving a subscriber profile including LBO service flow information from an Authentication, Authorization and Accounting (AAA) server, providing the LBO service flow information to a femto base station, and receiving information informing that an LBO service flow has been successfully set from the femto base station.

In accordance with further yet another aspect of the present invention, a femto base station for providing an LBO service in a wireless communication system is provided. The femto base station includes a service flow manager for, when receiving LBO service flow information from a femto gateway, transmitting a DSA request message including an LBO service indicator to a terminal in order to set LBO service flow, and after receiving a DSA response message from the terminal, transmitting a DSA ACK message to the terminal, and a DHCP server for allocating an IP address for an LBO service to the terminal through a DHCP procedure.

In accordance with still another aspect of the present invention, a terminal for providing an LBO service in a wireless communication system is provided. The terminal includes a controller for setting an initial service flow with a femto gateway to obtain a first IP address, after setting the initial service flow, receiving a DSA request message including an LBO service indicator from a femto base station, transmitting a DSA response message for the DSA request message to the femto base station, receiving a DSA ACK message for the DSA response message from the femto base station, and after setting the LBO service flow, obtaining a second IP address.

In accordance with still yet another aspect of the present invention, a system for providing an LBO service in a wireless communication system is provided. The system includes a femto gateway for setting an initial service flow to allocate a first IP address to a terminal, a femto base station for setting an LBO service flow information-based LBO service flow to allocate a second IP address to the terminal after setting the initial service flow, and the terminal for transmitting traffic using at least one of the first IP address and the second IP address.

In accordance with still further another aspect of the present invention, a method for providing an LBO service in a wireless communication system is provided. The method includes, after an access authentication procedure between an authentication server and a terminal, receiving, at a femto gateway, a subscriber profile including LBO service flow information from the authentication server to provide the LBO service flow information to a femto base station through initial service flow setting between the terminal and the femto gateway, setting, at the femto base station, an LBO service flow through a DSA procedure, and performing, at the terminal, a DHCP procedure through the LBO service flow setting, and obtaining an IP address for LBO based on the DHCP procedure.

In accordance with further another aspect of the present invention, a system for providing an LBO service in a wireless communication system is provided. The system includes, a femto gateway for, after an access authentication procedure between an authentication server and a terminal, receiving a subscriber profile including LBO service flow information from the authentication server to provide the LBO service flow information to a femto base station through initial service flow setting between the terminal and the femto gateway, the femto base station for setting an LBO service flow through a DSA procedure, and the terminal for performing a DHCP procedure through the LBO service flow setting, and for obtaining an IP address for LBO based on the DHCP procedure.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present invention provide a method and an apparatus for allowing a terminal accessing a femto base station to efficiently transmit data by providing a Local BreakOut (LBO) service in a wireless communication system.

Though the present invention is described using a broadband wireless communication system that uses the IEEE 802.16 standard, it is applicable to any communication system that supports a femto cell.

Figure 1:
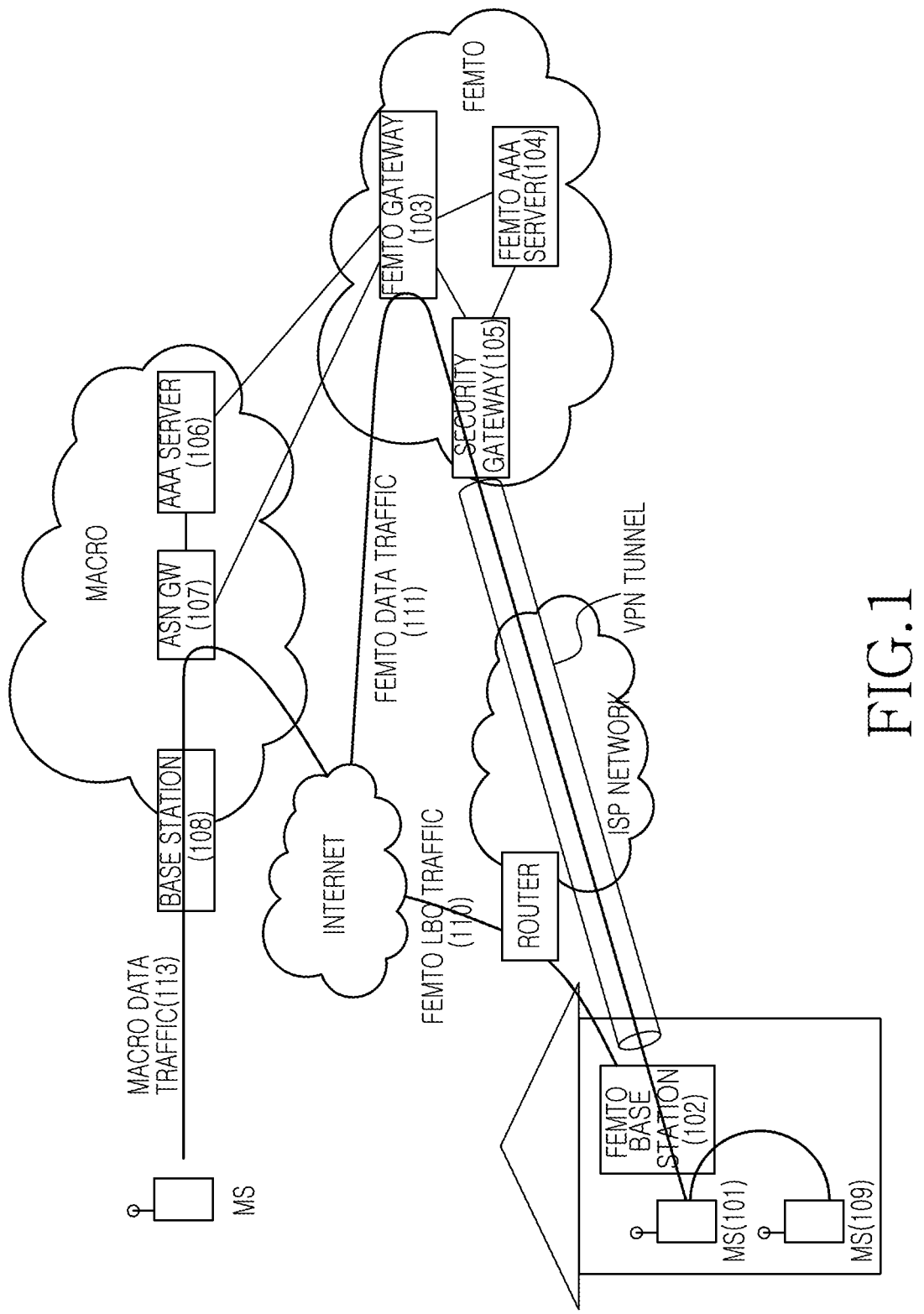
FIG. 1 illustrates a broadband wireless communication system for providing a Local BreakOut (LBO) service according to an exemplary embodiment of the present invention.

FIG. 1 illustrates a broadband wireless communication system for providing an LBO service according to an exemplary embodiment of the present invention.

Referring to FIG. 1, a femto base station 102 is an indoor base station used for an ultra small/low power household/office service area. The femto base station 102 transfers data of terminals (i.e., Mobile Stations (MSs)) 101 and 109 located within the household/office service area to a core network, or receives data from the core network to transfer the data to the terminals 101 and 109. In addition, the femto base station 102 supports handover and mobility of the terminals 101 and 109. Here, a plurality of femto base stations may exist inside a macro cell region. For convenience in description, FIG. 1 illustrates a single macro cell region and a single femto cell region.

The femto base station 102 installed in the indoor space accesses an Internet Service Provider (ISP) network via a cable or a Digital Subscriber Line (DSL) before accessing a data network of a mobile communication service provider. In addition, the femto base station 102 is connected with a security gateway 105 located in the mobile communication service provider network using a Virtual Private Network (VPN) tunnel to maintain security.

A macro base station 108 serves as a base station for servicing a macro cell. A macro cell denotes a cell of a general cellular system. An Access Service Network-GateWay (ASN-GW) 107 controls base stations and routes data between a core network and a base station. An Authentication, Authorization and Accounting (AAA) server 106 authenticates a terminal that accesses a network. A terminal that accesses the macro base station 108 is connected to the core network (or an Internet network) using a data transmission path 113 that includes the macro base station 108-ASN-GW 107.

The terminals 101 and 109 that access the femto base station 102 are connected to the core network (or an Internet network) using a data transmission path 111 that includes the femto base station 102-security gateway 105-femto gateway 103. Since a plurality of femto base stations inside a macro cell are connected with the Internet network via the femto gateway 103 of the mobile communication service provider, traffic of terminals connected to the plurality of femto base stations is concentrated on the femto gateway 103.

Therefore, exemplary embodiments of the present invention support an LBO service in order to reduce the concentration of traffic of terminals connected to a plurality of femto base stations on the femto gateway 103. The LBO service denotes a service in which the femto base station 102 does not forward data of a terminal to the data network of the mobile communication service provider (that is, does not transmit the data to the femto gateway 103), but directly transmits the data to the Internet network via a router of the ISP network (referred to as an LBO path 110 hereinafter).

An initial network procedure for the LBO service, an accounting procedure for the LBO service, and a network exit procedure are described with reference to FIGS. 3 to 5.

In addition, the LBO service supports connection between the terminals 101 and 109 serviced by the femto base station 102. In other words, the terminal 101 may exchange data with the terminal 109 without detouring via the Internet network.

A femto AAA server 104 performs authentication of the femto base station 102. The femto gateway 103 supports a femto cell-specialized function, for example, a Closed Subscriber Group (CSG) function besides a function (routing data between the femto base station 102 and the core network) provided by the existing ASN-GW 107. The CSG function refers to a list of terminals a femto user has registered in the femto base station in advance and allows access only to terminals included in the list.

Though the femto gateway 103 and the macro ASN-GW 107 have been illustrated as separated entities, when a femto cell-specialized function is realized in the ASN-GW 107, the ASN-GW 107 may simultaneously support the femto gateway function. Likewise, the femto AAA server 104 may be realized in the AAA server 106 located in the macro cell region. In addition, depending on realization, the security gateway 105 and the femto gateway 103 may be integrated.

As described above, a terminal inside the femto cell may minimize concentration of traffic on the femto gateway 103 by distributing and transmitting data through an LBO path 110 or a data traffic path 111 using an LBO service.

Figure 2:
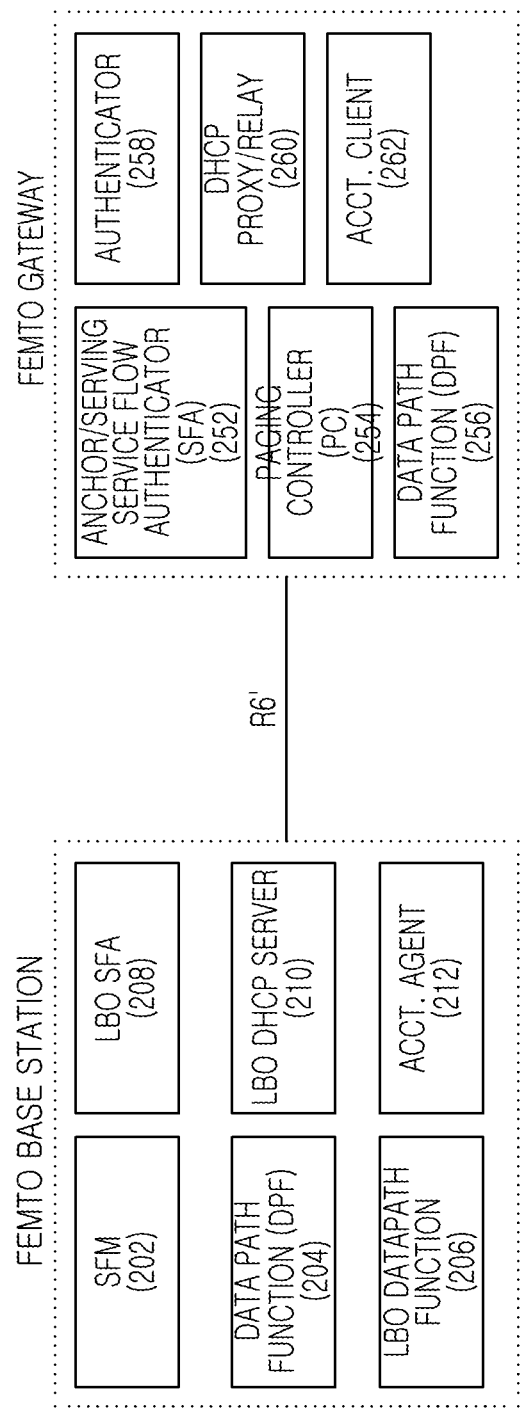
FIG. 2 is a functional block diagram illustrating a femto base station and a femto gateway for an LBO service in a broadband wireless communication system according to an exemplary embodiment of the present invention.

FIG. 2 is a functional block diagram illustrating a femto base station and a femto gateway for an LBO service in a broadband wireless communication system according to an exemplary embodiment of the present invention.

Referring to FIG. 2, the femto base station includes a Service Flow Management (SFM) 202, a Data Path Function (DPF) 204, an LBO DPF 206, an LBO Service Flow Authenticator (SFA) 208, an LBO Dynamic Host Configuration Protocol (DHCP) server 210, and an account agent 212. Here, a transmission/reception functional block of the femto base station and a control function block responsible for an overall control of the base station are not illustrated separately.

The SFM 202 manages generation, deletion, and change of a Service Flow (SF) based on a WiMAX Forum Network Working Group (NWG) standard. The DPF 204 is responsible for setting a bearer path between a femto base station and a femto gateway and data transmission. The LBO DPF 206 is responsible for setting a bearer path between a femto base station and the Internet and data transmission.

The LBO SFA 208 receives a Quality of Service (QoS) profile and LBO SF information from the AAA server to determine a permission to a service flow request for LBO of a terminal when the terminal performs a network entry procedure. The LBO SFA 208 communicates with the SFM 202 in order to generate a service for LBO, and is requested to generate a service flow for LBO through an SFA 252 of the femto gateway.

The LBO DHCP server 210 allocates an IP address of a terminal required for local routing. The LBO DPF 206 performs functions required for setting a data path for local use and transmission.

The account agent 212 requests an account client 262 of the femto gateway to start accounting after an IP address for an LBO service is allocated to a corresponding terminal.

The femto gateway includes the SFA 252, a Paging Controller (PC) 254, a DPF 256, an authenticator 258, a DHCP proxy/relay 260, and the account client 262. Here, a transmission/reception functional block of the femto gateway and a control function block responsible for an overall control of the gateway are not illustrated separately.

The SFA 252 receives a QoS profile and LBO SF information from the AAA server to request the LBO SFA 208 to generate a service flow for LBO.

The PC 254 manages idle mode context and paging of a terminal when the terminal enters an idle mode.

The DPF 256 is responsible for setting a bearer path between the femto base station and the femto gateway and data transmission.

The SFA 252 defined by the macro ASN-GW downloads a QoS profile from the AAA server to perform determination for a service flow request of a terminal when the terminal performs a network entry procedure.

The DHCP proxy/relay 260 allocates an IP address to a terminal. At this point, the allocated address of the terminal is required for routing a packet to a core network of a service provider.

The authenticator 258 performs authentication of a terminal based on an Extensible Authentication Protocol (EAP) 3 party model. That is, the authenticator 258 performs pass-through of an authentication-related message between the AAA server and the terminal.

When requested by the account agent 212 of the femto base station to start billing, the account client 262 counts billing.

Figure 3:
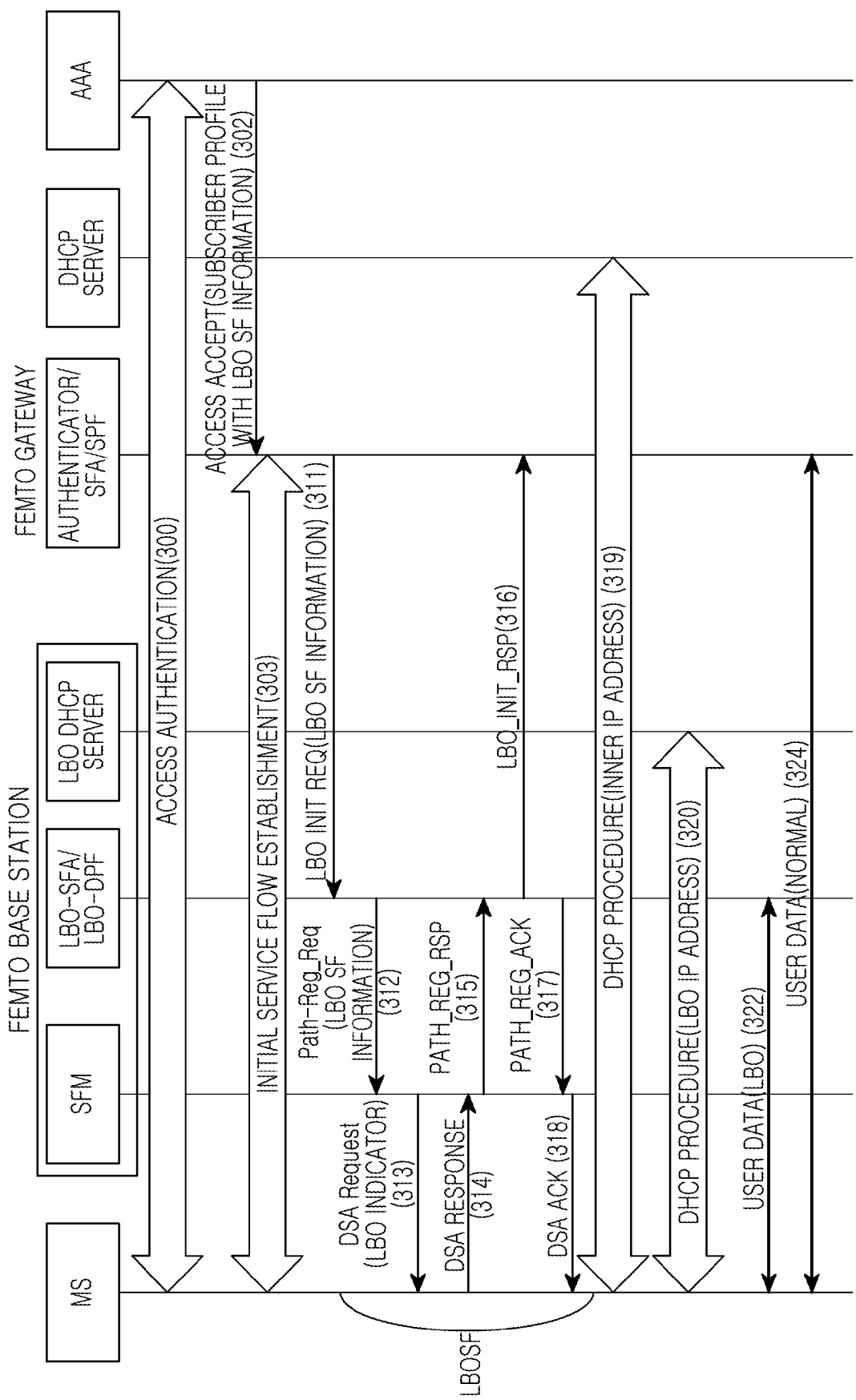
FIG. 3 illustrates an initial network entry procedure for an LBO service in a broadband wireless communication system according to an exemplary embodiment of the present invention.

FIG. 3 illustrates an initial network entry procedure for an LBO service in a broadband wireless communication system according to an exemplary embodiment of the present invention.

An exemplary embodiment of the present invention is described using an example in which Remote Authentication Dial In User Service (RADIUS) is used as a communication protocol between the femto gateway 103 and the AAA server 106. As an alternative, the function may be realized using DIAMETER rather than RADIUS. After a terminal is powered on, when the terminal accesses a network initially, the terminal performs an initial network entry procedure. At this point, a VPN tunnel is set between the femto base station and the security gateway, so that all messages exchanged between the femto base station and the femto gateway are transferred via the VPN tunnel.

Referring to FIG. 3, the terminal performs an authentication procedure with the AAA server 106 using an EAP message in step 300.

The femto gateway receives an access accept message including LBO SF information and a subscriber profile from the AAA server in step 302. The LBO SF information includes information as to whether a corresponding terminal subscribes to an LBO service and information required for determining LBO SF traffic for the corresponding terminal.

The terminal and the femto gateway perform a procedure for generating an Initial Service Flow (ISF) in step 303. At this point, data is transmitted between the terminal and the femto gateway via a set data path. Since the ISF procedure is the same as a procedure defined in WiMAX Forum Network Architecture stage 3, description thereof is omitted.

After ISF generation ends, the femto gateway transfers QoS profile information required for generating LBO service flow to the femto base station (LBO-SFA/DPF) in step 311.

The LBO-SFA inside the femto base station performs substantially the same function as that of an SFA of the femto gateway, and the LBO-SFA/DPF transmits a Path_Reg_Req message to the SFM in order to set a data path for an LBO service in step 312. At this point, the LBO-SFA/DPF transfers QoS information for an LBO service.

The femto base station (SFM) determines whether sufficient radio resources exist and if acceptable, transmits a Dynamic Service Add (DSA)-request message including an indicator indicating a service flow for an LBO service to the terminal in step 313. At this point, the indicator indicating the service flow for the LBO service is defined using a separate parameter inside a service flow, or a portion of a Service Flow IDentifier (SFID) may be defined and used as a range for an LBO service.

The terminal that has received a DSA-request message for an LBO service transmits a DSA response message to the femto base station (SFM) in step 314. In addition, the femto base station (SFM) transmits a Path_Reg_Rsp message to the femto base station (LBO-SFA/DPF) in step 315.

The femto base station (LBO-SFA/DPF) transmits an LBO init_RSP message, informing that an LBO service flow has been successfully performed, to the femto gateway in step 316, and transmits a Path_Reg_ACK message to the femto base station (SFM) in step 317.

The femto base station (SFM) transmits a DSA ACK message to the terminal in step 318.

The terminal performs a DHCP procedure with the femto gateway to obtain a first IP address in step 319. The first IP address is used when the terminal transfers data to the Internet network via a mobile communication network. That is, the first IP address is used when data is transferred via a path of femto base station-ISP network-security gateway-femto gateway-Internet. In an exemplary implementation, step 319 may be immediately performed after step 303 is performed.

The terminal that has received the DSA request message for the LBO service generates one more service flow for an LBO service besides an existing service flow (steps 313, 314, and 318), and again performs a DHCP procedure for generating an IP session for local use on an LBO service flow to obtain a second IP address in step 320. At this point, since the allocated second IP address needs to be routable in an ISP network, when an ISP service provider and a femto service provider are different, the LBO DHCP server inside the femto base station may relay a DHCP message to a different DHCP server inside the ISP network. A routable IP address in the ISP network may be set at an IP pool inside the femto base station through a promise between service providers in advance. In addition, the femto base station may allocate a private IP address to a terminal and perform a Network Address Translation (NAT) function. In FIG. 1, when data is transferred via a path of femto base station-ISP network-router-Internet, the second IP address is used.

The terminal transmits/receives data using the first IP address and the second IP address obtained in steps 322 and 324.

As described above, the terminal obtains the first IP address required for routing inside the core network of the mobile communication service provider through the first DHCP procedure, and obtains the second IP address for an LBO service required for immediately transmitting data to the Internet by way of the network of the ISP service provider through the second DHCP procedure.

Figure 4:
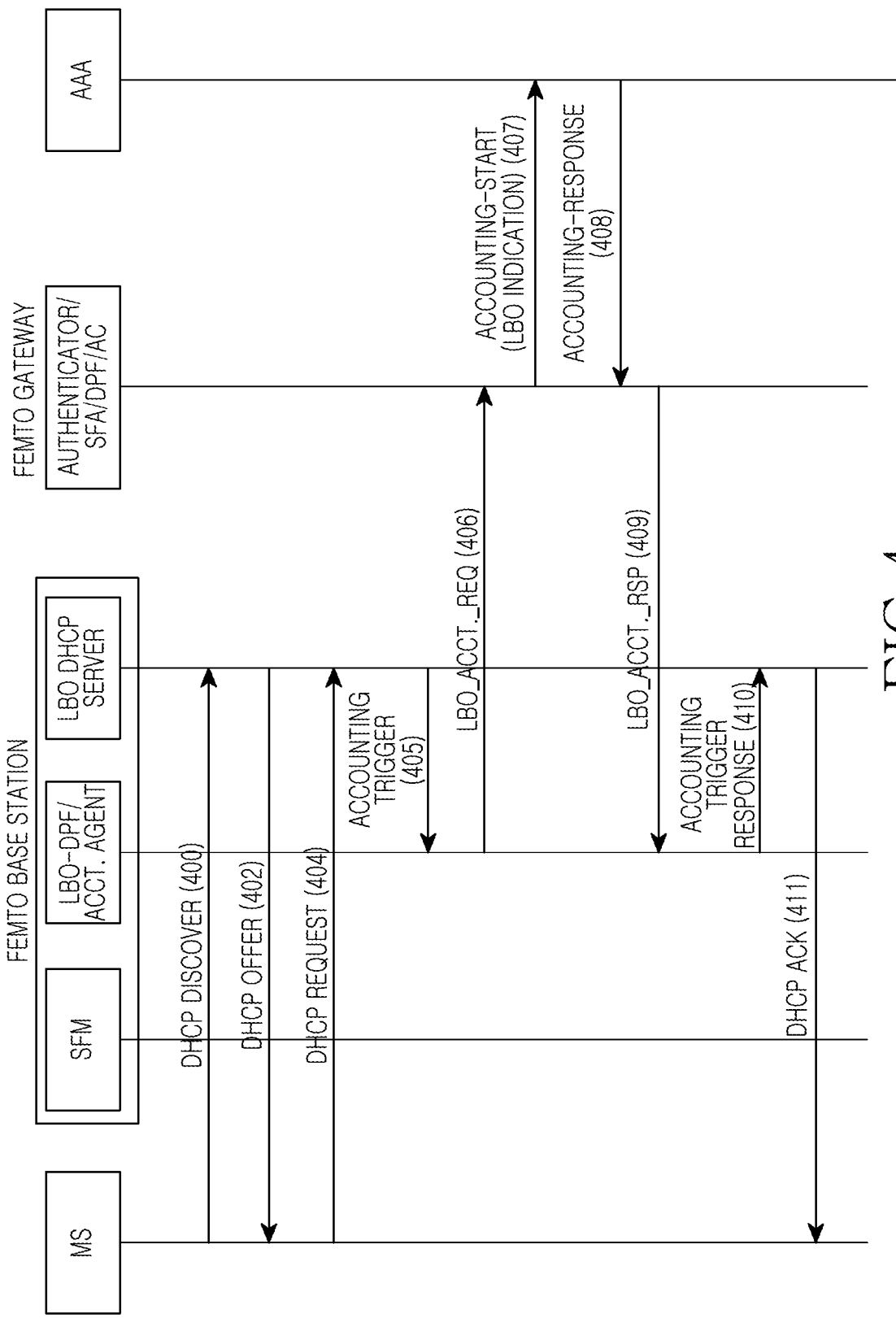
FIG. 4 is a diagram illustrating a billing start procedure for an LBO service in a broadband wireless communication system according to an exemplary embodiment of the present invention.

FIG. 4 is a diagram illustrating a billing start procedure for an LBO service in a broadband wireless communication system according to an exemplary embodiment of the present invention.

Referring to FIG. 4, based on a service flow for LBO, a terminal transmits a DHCP DISCOVER message in step 400. An LBO DHCP server transmits a DHCP OFFER message to the terminal in step 402. In addition, the terminal transmits a DHCP request message to the LBO DHCP server in step 404. Through the above process, the terminal obtains an IP address for LBO.

When receiving the DHCP request message, the LBO DHCP server transmits an accounting trigger message to the femto base station (account agent) in step 405, so that the account agent starts accounting.

The femto base station (account agent) transmits an LBO_Acct_Req message requesting the femto gateway (account client) to start accounting in order to start an accounting procedure in step 406.

The femto gateway transmits an accounting start message including an LBO indicator to the AAA server in step 407.

The AAA server responds with an accounting response message in step 408.

The femto gateway transmits an LBO_Acct_Rsp message to the femto base station as a response message to the LBO_Acct_Req message in step 409.

The femto base station (account agent) informs the LBO DHCP server that accounting start has been successfully performed (accounting trigger response) in step 410.

The LBO DHCP server completes the DHCP procedure by transmitting a DHCP ACK message to the terminal in step 411.

Figure 5:
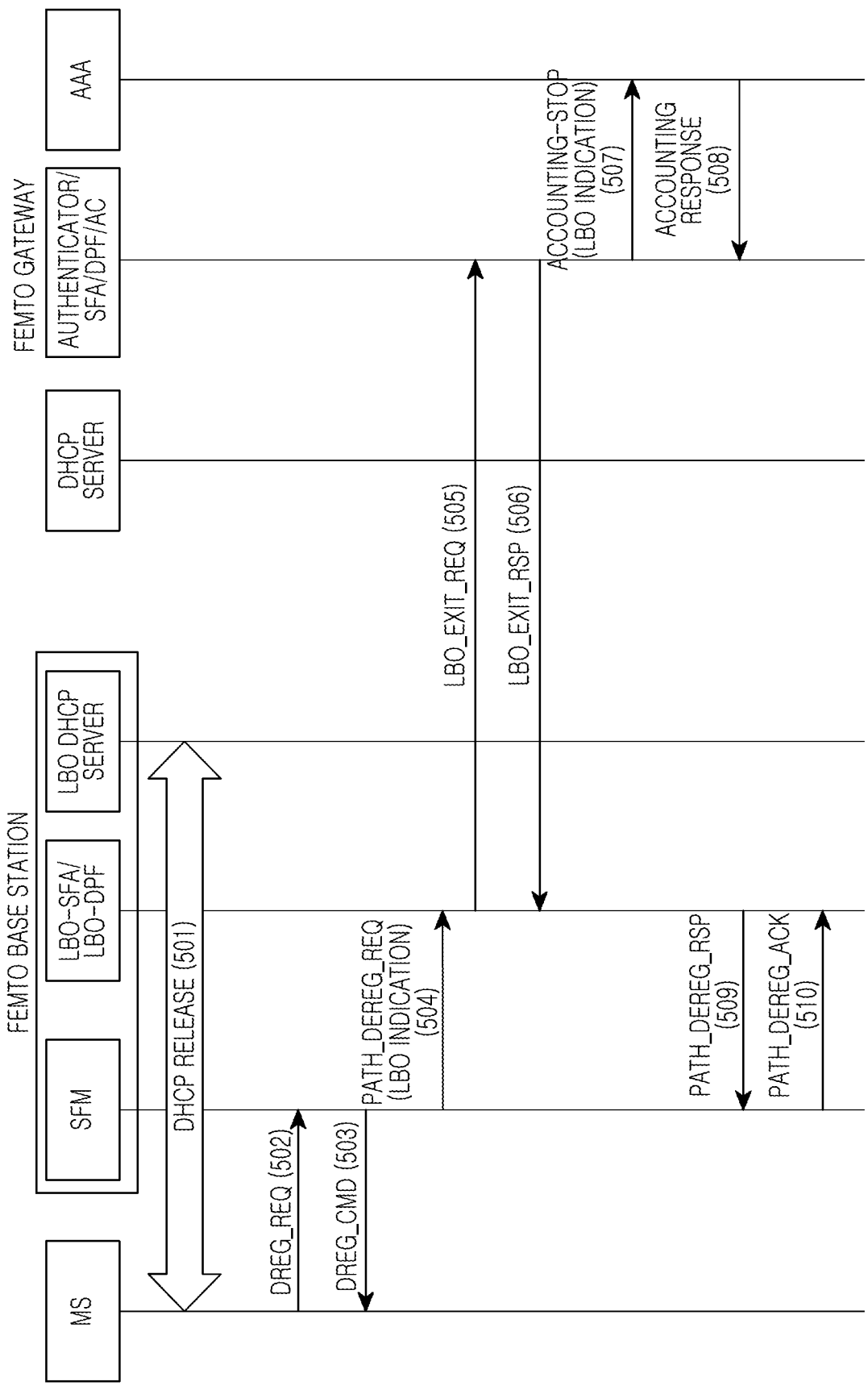
FIG. 5 is a diagram illustrating an MS initiated network exit procedure in a broadband wireless communication system according to an exemplary embodiment of the present invention.

FIG. 5 is a diagram illustrating an MS initiated network exit procedure in a broadband wireless communication system according to an exemplary embodiment of the present invention.

Referring to FIG. 5, a terminal (Mobile Station (MS)) performs a DHCP release procedure in order to end an LBO IP session in step 501.

The terminal transmits a DREG-REQ message to the femto base station in order to exit the network in step 502. The femto base station (SFM) responds to the terminal with a DREG-CMD message in step 503.

The femto base station (SFM) transmits a Path_Dereg_Req message including LBO indication to the LBO-SFA in step 504. At this point, an indicator representing an LBO service may be defined using a separate parameter inside a service flow, or a portion of an SFID may be discriminated and used as a range for an LBO.

The femto base station (LBO-SFA) transmits an LBO_Exit_Req message requesting LBO service end to the femto gateway (SFA) in step 505, and the femto gateway responds with an LBO_Exit_Rsp message in step 506.

The femto gateway transmits an accounting stop message including LBO indication to the AAA server to stop LBO accounting in step 507.

The AAA server responds with an accounting response message to stop accounting in step 508.

The femto base station (LBO SFA/DPF) that has received an LBO_Exit_Rsp message transmits a Path_Dereg_Rsp message to the SFM in step 509, and the SFM responds to the LBO-SFA with a Path_Dereg_Ack message in step 510.

Figure 6:
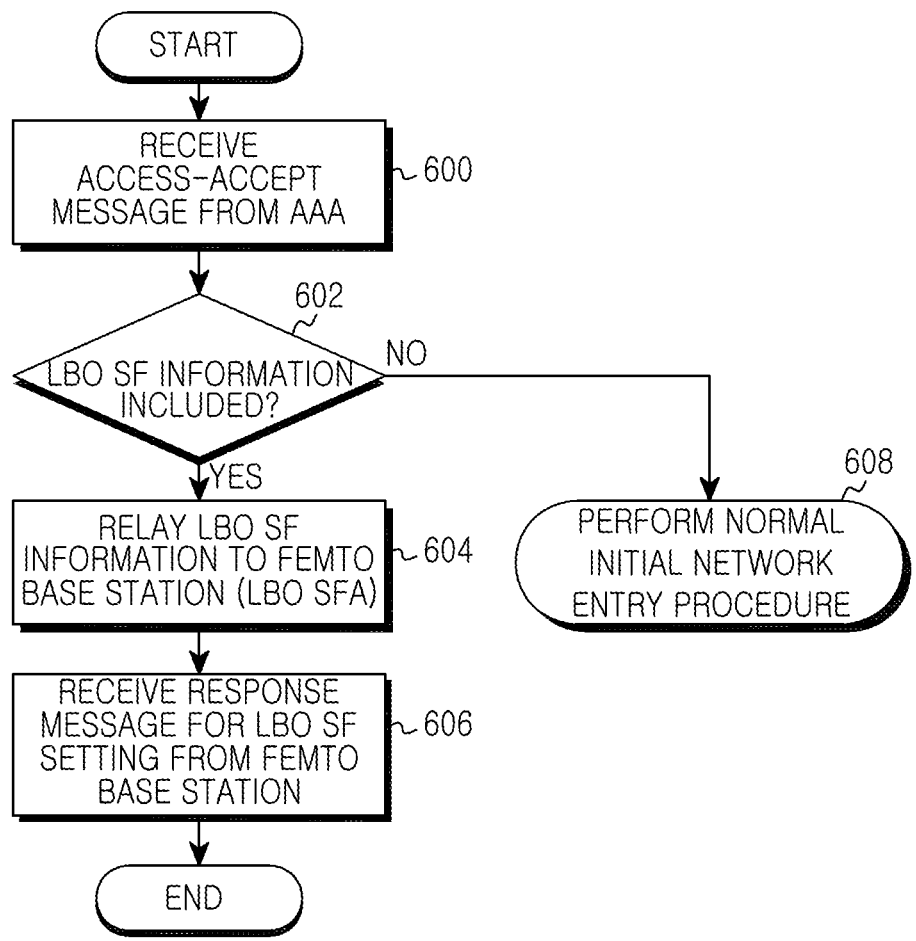
FIG. 6 is a flowchart illustrating an operation of a femto gateway for an LBO service in a broadband wireless communication system according to an exemplary embodiment of the present invention.

FIG. 6 is a flowchart illustrating an operation of a femto gateway for an LBO service in a broadband wireless communication system according to an exemplary embodiment of the present invention.

Referring to FIG. 6, the femto gateway receives an access accept message including LBO SF information and a subscriber profile from the AAA server in step 600.

The femto gateway determines whether the LBO SF information is included in the access accept message in step 602. When it is determined in step 602 that the LBO SF information is included in the access accept message, the femto gateway relays the LBO SF information to the femto base station in step 604.

The femto gateway receives information informing that an LBO service flow has been successfully set from the femto base station in step 606.

In contrast, when it is determined in step 602 that the LBO SF information is not included in the access accept message, the femto gateway performs the conventional initial network procedure in step 608.

Figure 7:
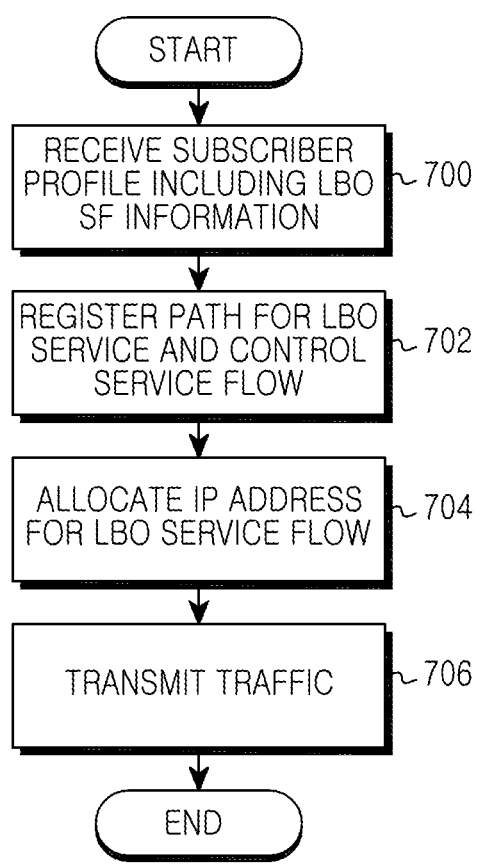
FIG. 7 is a flowchart illustrating an operation of a femto base station for an LBO service in a broadband wireless communication system according to an exemplary embodiment of the present invention.

FIG. 7 is a flowchart illustrating an operation of a femto base station for an LBO service in a broadband wireless communication system according to an exemplary embodiment of the present invention.

Referring to FIG. 7, the femto base station receives a subscriber profile including LBO SF information from the femto gateway in step 700.

The femto base station registers a path for an LBO service in a relevant terminal and generates a service flow using LBO indication information in step 702.

The femto base station allocates an IP address for an LBO service flow to the terminal in step 704.

The femto base station transfers traffic of the relevant terminal using an IP address for LBO in step 706.

Figure 8:
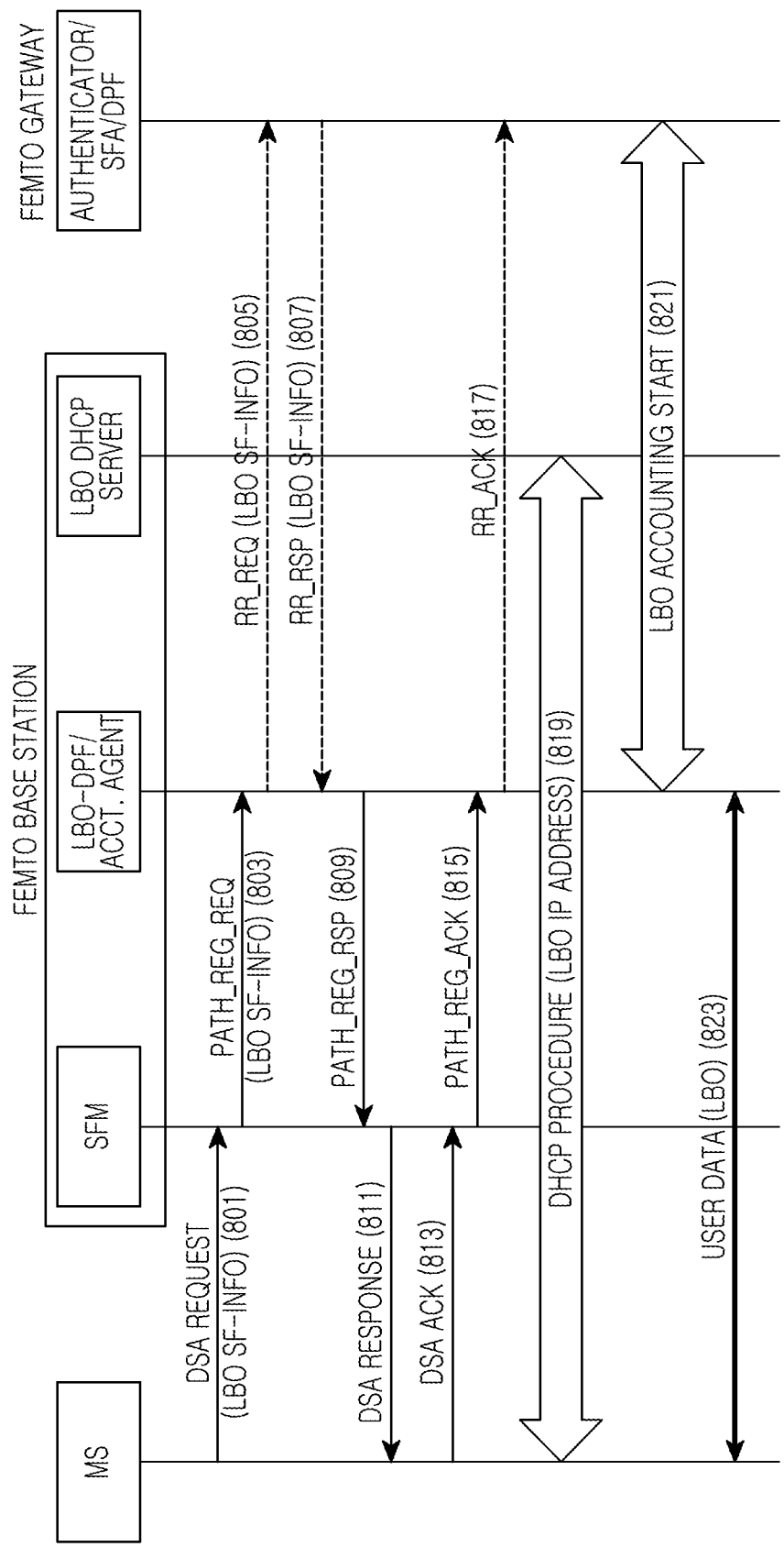
FIG. 8 is a diagram illustrating an LBO service flow generation procedure started by a terminal in a broadband wireless communication system according to an exemplary embodiment of the present invention.

Though the exemplary embodiment of FIG. 3 has described the case where an LBO service is started by the femto base station, an LBO service may be started by a terminal as in an exemplary embodiment of FIG. 8.

FIG. 8 is a diagram illustrating an LBO service flow generation procedure started by a terminal in a broadband wireless communication system according to an exemplary embodiment of the present invention.

Referring to FIG. 8, the terminal transmits a DSA-request message to the femto base station (SFM) in step 801. The message includes service flow information for LBO.

The femto base station (SFM) determines whether sufficient radio resources exist and if acceptable, transfers a Path_Reg_Req message to the femto base station (LBO-SFA/DPF) in step 803.

The femto base station (LBO-SFA/DPF) transmits an RR_Req message to the femto gateway in step 805. The femto gateway may change LBO service flow information requested by the terminal and, in the case of modifying the LBO service flow information, incorporates updated LBO service flow information into an RR_Rsp message and transmits the same to the femto base station (LBO-SFA/DPF) in step 807. In an exemplary implementation, steps 805 and 807 may be omitted.

The femto base station (LBO-SFA/DPF) transmits a Path_Reg_Rsp message to the femto base station (SFM) in step 809. In addition, the femto base station (SFM) transmits a DSA response message to the terminal in step 811.

The terminal transmits a DSA ACK message to the femto base station (SFM) in step 813. In addition, the femto base station (SFM) transmits a Path_Reg_Ack message to the femto base station (LBO-SFA/LBO-DPF) in step 815.

The femto base station (LBO-SFA/DPF) transmits an RR_Ack message to the femto gateway in step 817.

The terminal performs a DHCP procedure for an LBO service flow to obtain a second IP address in step 819. At this point, since the allocated second IP address needs to be routable in an ISP network, when an ISP service provider and a femto service provider are different, the LBO DHCP server inside the femto base station may relay a DHCP message to a different DHCP server inside the ISP network. A routable IP address in the ISP network may be set at an IP pool inside the femto base station through a procedure between service providers in advance. In addition, the femto base station may allocate a private IP address to a terminal and perform a Network Address Translation (NAT) function.

The femto base station (LBO-SFA/DPF) and the femto gateway perform an accounting procedure for an LBO service flow in step 821. The terminal transmits/receives data using the second IP address obtained in step 823.

As described above, exemplary embodiments of the present invention have advantages of minimizing an influence on a performance of the femto gateway and allowing the terminal to transmit data more efficiently by providing an LBO service to the terminal that accesses the femto base station.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for operating a femto gateway to provide a Local BreakOut (LBO) service in a wireless communication system, the method comprising:
    after an access authentication process between an authentication server and a terminal, receiving a subscriber profile comprising LBO service flow information from the authentication server;
    after establishing an initial service flow between the terminal and the femto gateway, providing the LBO service flow information to a femto base station; and
    receiving information informing that an LBO service flow has been successfully established from the femto base station,
    wherein the femto base station distributes LBO traffic of the terminal via an LBO path established between the femto base station and an Internet network through an Internet Service Provider (ISP) network using a second Internet Protocol (IP) address, and distributes data traffic of the terminal via a data traffic path established between the femto base station and the Internet network through the ISP network and the femto gateway using a first IP address, and wherein the femto base station supports a direct connection between the terminal and another terminal serviced by the femto base station without detouring via the Internet network,
    wherein the first IP address is obtained from a Dynamic Host Configuration Protocol (DHCP) server of the femto gateway, and
    wherein the second IP address is obtained from a DHCP server of the femto base station.

2. The method of claim 1, wherein the femto gateway and the femto base station are connected via a Virtual Private Network (VPN).

3. A method for operating a femto base station to provide a Local BreakOut (LBO) service in a wireless communication system, the method comprising:
    after an initial service flow has been established between a terminal and a femto gateway, receiving LBO service flow information from the femto gateway, transmitting a Dynamic Service Addition (DSA) request message comprising an LBO service indicator to the terminal in order to establish an LBO service flow;
    after receiving a DSA response message from the terminal, transmitting a DSA ACK message to the terminal; and
    allocating a first Internet Protocol (IP) address for the initial service to the terminal through a first Dynamic Host Configuration Protocol (DHCP) procedure and allocating a second Internet Protocol (IP) address for the LBO service to the terminal through a second DHCP procedure,
    wherein the femto base station distributes LBO traffic of the terminal via an LBO path established between the femto base station and an Internet network through an Internet Service Provider (ISP) network using the second IP address, and distributes data traffic of the terminal via a data traffic path established between the femto base station and the Internet network through the ISP network and the femto gateway using the first IP address, and
    wherein the femto base station supports a direct connection between the terminal and another terminal serviced by the femto base station without detouring via the Internet network,
    wherein the first DHCP procedure is performed with a DHCP server of the femto gateway, and
    wherein the second DHCP procedure is performed with a DHCP server of the femto base station.

4. The method of claim 3, further comprising: transferring traffic of the terminal to a core network using the allocated first IP address for the initial service.

5. The method of claim 3, wherein the femto gateway and the femto base station are connected via a Virtual Private Network (VPN).

6. The method of claim 3, wherein the LBO service indicator is defined using at least one of a separate parameter and a Service Flow IDentifier (SFID) for the LBO service indicator.

7. The method of claim 3, further comprising:
    transmitting a message informing that the LBO service flow has been successfully set to the femto gateway.

8. A method for operating a terminal to provide a Local BreakOut (LBO) service in a wireless communication system, the method comprising:
    establishing an initial service flow with a femto gateway, to obtain a first Internet Protocol (IP) address for the initial service;
    after the setting of establishing the initial service flow, receiving a Dynamic Service Addition (DSA) request message comprising an LBO service indicator from a femto base station;
    transmitting a DSA response message for the DSA request message to the femto base station, and receiving a DSA ACK message for the DSA response message from the femto base station; and
    after establishing an LBO service flow, obtaining a second IP address for the LBO service,
    wherein the femto base station distributes LBO traffic of the terminal via an LBO path established between the femto base station and an Internet network through an Internet Service Provider (ISP) network using the second IP address, and distributes data traffic of the terminal via a data traffic path established between the femto base station and the Internet network through the ISP network and the femto gateway using the first IP address, and
    wherein the femto base station supports a direct connection between the terminal and another terminal serviced by the femto base station without detouring via the Internet network,
    wherein the first IP address is obtained from a Dynamic Host Configuration Protocol (DHCP) server of the femto gateway, and
    wherein the second IP address is obtained from a DHCP server of the femto base station.

9. The method of claim 8, wherein at least one of the LBO service indicator is defined using a separate parameter, and a Service Flow IDentifier (SFID) for the LBO service indicator is discriminated and used.

10. A method for providing a Local BreakOut (LBO) service in a wireless communication system, the method comprising:
performing an access authentication process between a terminal and an authentication server;
after receiving a subscriber profile comprising LBO service flow information from the authentication server at a femto gateway, establishing, at the femto gateway, an initial service flow and allocating a first Internet Protocol (IP) address to the terminal;
after establishing the initial service flow, establishing, at a femto base station, an LBO service flow information-based LBO service flow to allocate a second IP address to the terminal; and
transmitting, at the terminal, data traffic using the first IP address and LBO traffic using the second IP address,
wherein the femto base station distributes LBO traffic of the terminal via an LBO path established between the femto base station and an Internet network through an Internet Service Provider (ISP) network using the second IP address, and distributes data traffic of the terminal via a data traffic path established between the femto base station and the Internet network through the ISP network and the femto gateway using the first IP address, and
wherein the femto base station supports a direct connection between the terminal and another terminal serviced by the femto base station without detouring via the Internet network,
wherein the first IP address is obtained from a Dynamic Host Configuration Protocol (DHCP) server of the femto gateway, and
wherein the second IP address is obtained from a DHCP server of the femto base station.

11. The method of claim 10, wherein the establishing of the LBO service flow information-based LBO service flow to allocate the second IP address comprises:
after obtaining, at the femto base station, LBO service information from an authentication server, transmitting a Dynamic Service Addition (DSA) request message comprising LBO indicator information to the terminal;
transmitting, at the terminal, a DSA response message for the DSA request message to the femto base station;
transmitting, at the femto base station, a DSA ACK message for the DSA response message to the terminal; and
after receiving, at the terminal, the DSA ACK message, performing a DHCP procedure with the femto base station.

12. The method of claim 11, wherein the LBO service indicator is defined using at least one of a separate parameter and a Service Flow IDentifier (SFID) for the LBO service indicator.

13. A method for starting an accounting for a Local BreakOut (LBO) service in a wireless communication system, the method comprising:
requesting, at a femto base station, a femto gateway to start accounting for the LBO service during a Dynamic Host Configuration Protocol (DHCP) procedure;
requesting, at the femto gateway, an authentication server to start an accounting;
transmitting, at the authentication server, a response message for an accounting request to the femto gateway, and transmitting, at the femto gateway, a response message for the accounting request to the femto base station; and
when receiving, at the femto base station, a response message for the accounting request, transmitting a DHCP ACK message to a terminal,
wherein the femto base station distributes LBO traffic of the terminal via an LBO path established between the femto base station and an Internet network through an Internet Service Provider (ISP) network using a second Internet Protocol (IP) address, and distributes data traffic of the terminal via a data traffic path established between the femto base station and the Internet network through the ISP network and the femto gateway using a first IP address,
wherein the femto base station supports a direct connection between the terminal and another terminal serviced by the femto base station without detouring via the Internet network,
wherein the first IP address is obtained from a Dynamic Host Configuration Protocol (DHCP) server of the femto base station, and
wherein the second IP address is obtained from a DHCP server of the femto gateway.

14. A method for exiting a Mobile Station (MS)-initiated network during a Local BreakOut (LBO) service in a wireless communication system, the method comprising:
after releasing a Dynamic Host Configuration Protocol (DHCP) procedure, transmitting, at the MS, a registration release request message to a femto base station;
transmitting, at the femto base station, a message requesting an LBO service exit to a femto gateway; and
after the femto base station receiving a response to the request from the femto gateway, transmitting, at the femto gateway, a request to an authentication server to stop accounting, and receiving a response message to the request to stop accounting,
wherein the femto base station distributes LBO traffic of the MS via an LBO path established between the femto base station and an Internet network through an Internet Service Provider (ISP) network using a first Internet Protocol (IP) address, and distributes data traffic of the MS via a data traffic path established between the femto base station and the Internet network through the ISP network and the femto gateway using a second IP address,
wherein the femto base station supports a direct connection between the MS and another MS serviced by the femto base station without detouring via the Internet network,
wherein the first IP address is obtained from a DHCP server of the femto base station, and
wherein a second IP address is obtained from a DHCP server of the femto gateway.

15. An apparatus of a femto gateway for providing a Local BreakOut (LBO) service in a wireless communication system, the apparatus comprising:
a controller for, after an access authentication procedure between an authentication server and a terminal, receiving a subscriber profile comprising LBO service flow information from the authentication server,
after establishing an initial service flow between the terminal and the femto gateway, providing LBO service flow information to a femto base station, and
receiving information informing that an LBO service flow has been successfully established from the femto base station,
wherein the femto base station distributes LBO traffic of the terminal via an LBO path established between the femto base station and an Internet network through an Internet Service Provider (ISP) network using a second Internet Protocol (IP) address, and distributes data traffic of the terminal via a data traffic path established between the femto base station and the Internet network through the ISP network and the femto gateway using a first IP address, and wherein the femto base station supports a direct connection between the terminal and another terminal serviced by the femto base station without detouring via the Internet network, wherein the first IP address is obtained from a Dynamic Host Configuration Protocol (DHCP) server of the femto gateway, and wherein the second IP address is obtained from a DHCP server of the femto base station.

16. The apparatus of claim 15, further comprising a service flow authenticator for establishing an initial service flow with the terminal.

17. The apparatus of claim 15, wherein the femto gateway and the femto base station are connected via a Virtual Private Network (VPN).

18. A femto base station for providing a Local BreakOut (LBO) service in a wireless communication system, the femto base station comprising:

a service flow manager for, after an initial service flow has been established between a terminal and a femto gateway, receiving LBO service flow information from the femto gateway, transmitting a Dynamic Service Addition (DSA) request message comprising an LBO service indicator to the terminal in order to establish an LBO service flow, and, after receiving a DSA response message from the terminal, for transmitting a message informing that the LBO service flow has been successfully established to the femto gateway, and transmitting a DSA ACK message to the terminal; and a Dynamic Host Configuration Protocol (DHCP) server for allocating a second Internet Protocol (IP) address to the terminal through a DHCP procedure, wherein the femto base station distributes LBO traffic of the terminal via an LBO path established between the femto base station and an Internet network through an Internet Service Provider (ISP) network using the second IP address, and distributes data traffic of the terminal via a data traffic path established between the femto base station and the Internet network through the ISP network and the femto gateway using a first IP address, wherein the femto base station supports a direct connection between the terminal and another terminal serviced by the femto base station without detouring via the Internet network, and wherein the second IP address is allocated to the terminal by a femto gateway DHCP server.

19. The femto base station of claim 18, wherein the femto gateway and the femto base station are connected via a Virtual Private Network (VPN).

20. The femto base station of claim 18, wherein the LBO service indicator is defined using at least one of a separate parameter and a Service Flow IDentifier (SFID) for the LBO service indicator.

21. A terminal for providing a Local BreakOut (LBO) service in a wireless communication system, the terminal comprising:

a controller for establishing an initial service flow with a femto gateway to obtain a first Internet Protocol (IP) address for the initial service, for, after establishing the initial service flow, receiving a Dynamic Service Addition (DSA) request message comprising an LBO service indicator from a femto base station, for transmitting a DSA response message for the DSA request message to the femto base station, for receiving a DSA ACK message for the DSA response message from the femto base station, and for, after establishing the LBO service flow, obtaining a second IP address for the LBO service, wherein the femto base station distributes LBO traffic of the terminal via an LBO path established between the femto base station and an Internet network through an Internet Service Provider (ISP) network using the second IP address, and distributes data traffic of the terminal via a data traffic path established between the femto base station and the Internet network through the ISP network and the femto gateway using the first IP address, wherein the femto base station supports a direct connection between the terminal and another terminal serviced by the femto base station without detouring via the Internet network, wherein the first IP address is obtained from a Dynamic Host Configuration Protocol (DHCP) server of the femto gateway, and wherein the second IP address is obtained from a DHCP server of the femto base station.

22. The terminal of claim 21, wherein the LBO service indicator is defined using at least one of a separate parameter and a Service Flow IDentifier (SFID) for the LBO service indicator.

23. A system for providing a Local BreakOut (LBO) service in a wireless communication system, the system comprising:

an authentication server for performing an access authentication process with a terminal;

a femto gateway for establishing an initial service flow to allocate a first Internet Protocol (IP) address to the terminal;

a femto base station for establishing an LBO service flow information-based LBO service flow to allocate a second IP address to the terminal after establishing the initial service flow; and the terminal for transmitting data traffic using the first IP address and LBO traffic using the second IP address, wherein the femto base station distributes LBO traffic of the terminal via an LBO path established between the femto base station and an Internet network through an Internet Service Provider (ISP) network using the second IP address, and distributes the data traffic of the terminal via a data traffic path established between the femto base station and the Internet network through the ISP network and the femto gateway using the first IP address, wherein the femto base station supports a direct connection between the terminal and another terminal serviced by the femto base station without detouring via the Internet network, wherein the first IP address is allocated by a Dynamic Host Configuration Protocol (DHCP) server of the femto gateway, and wherein the second IP address is allocated by a DHCP server of the femto base station.

24. The system of claim 23, wherein the femto base station transmits a Dynamic Service Addition (DSA) request message comprising LBO indicator information to the terminal after obtaining LBO service information from an authentication server,
 receives a DSA response message for the DSA request message from the terminal,
 transmits a DSA ACK message for the DSA response message to the terminal, and
 after the terminal receives the DSA ACK message, performs a Dynamic Host Configuration Protocol (DHCP) procedure with the terminal.

25. The system of claim 24, wherein the LBO service indicator is defined using at least one of a separate parameter and a Service Flow IDentifier (SFID) for the LBO service indicator.

26. A method for providing a Local BreakOut (LBO) service in a wireless communication system, the method comprising:
 after an access authentication procedure between an authentication server and a terminal, receiving, at a femto gateway, a subscriber profile comprising LBO service flow information from the authentication server to provide the LBO service flow information to a femto base station through establishing an initial service flow between the terminal and the femto gateway;
 establishing, at the femto base station, an LBO service flow through a Dynamic Service Addition (DSA) procedure; and
 performing, at the terminal, a Dynamic Host Configuration Protocol (DHCP) procedure with the femto base station through the established LBO service flow, and obtaining a first Internet Protocol (IP) address for LBO based on the DHCP procedure,
 wherein the femto base station distributes LBO traffic of the terminal via an LBO path established between the femto base station and an Internet network through an Internet Service Provider (ISP) network using the first IP address for LBO based on the DHCP procedure, and distributes data traffic of the terminal via a data traffic path established between the femto base station and the Internet network through the ISP network and the femto gateway using a second IP address,
 wherein the femto base station supports a direct connection between the terminal and another terminal serviced by the femto base station without detouring via the Internet network, and
 wherein the terminal obtains the second IP address from a DHCP server of the femto gateway.

27. The method of claim 26, wherein the performing, at the terminal, of the Dynamic Host Configuration Protocol (DHCP) procedure through establishing the LBO service flow and the obtaining of the first IP address for LBO based on the DHCP procedure comprises:
 after establishing an initial service flow between the terminal and the femto base station, receiving a DSA request message comprising an LBO service indicator from the femto base station;
 transmitting a DSA response message for the DSA request message to the femto base station, and receiving a DSA ACK message for the DSA response message from the femto base station; and
 after establishing the LBO service flow, obtaining the first IP address for the LBO based on the DHCP procedure.

28. The method of claim 26, wherein establishing, at the femto base station, of the LBO service flow through the DSA procedure comprises:
 when receiving LBO service flow information from the femto gateway, transmitting a DSA request message comprising an LBO service indicator to the terminal in order to establish the LBO service flow;
 after receiving a DSA response message from the terminal, transmitting the DSA ACK message to the terminal; and
 allocating the first IP address for an LBO service to the terminal through the DHCP procedure.

29. The method of claim 26, further comprising:
 receiving, at the femto gateway, information informing that the LBO service flow has been successfully established from the femto base station.

30. The method of claim 26, wherein the femto gateway and the femto base station are connected via a Virtual Private Network (VPN).

31. The method of claim 26, further comprising:
 during the DHCP procedure, requesting, at the femto base station, the femto gateway to start accounting for an LBO service;
 requesting, at the femto gateway, the authentication server to start accounting;
 transmitting, at the authentication server, a response message for an accounting request to the femto gateway, and transmitting, at the femto gateway, a response message for the accounting request to the femto base station; and
 when receiving, at the femto base station, the response message for the accounting request, transmitting a DHCP ACK message to the terminal.

32. The method of claim 26, further comprising:
 after releasing the DHCP procedure, transmitting, at the terminal, a registration release request message to the femto base station;
 transmitting, at the femto base station, a message requesting an LBO service end to the femto gateway, and receiving a response message from the femto gateway; and
 requesting the femto gateway and the authentication server to stop billing to receive a response message.

33. The method of claim 26, wherein the LBO service indicator is defined using at least one of a separate parameter and a Service Flow IDentifier (SFID) for the LBO service indicator.

34. A system for providing a Local BreakOut (LBO) service in a wireless communication system, the system comprising:
 a femto gateway for, after an access authentication procedure between an authentication server and a terminal, receiving a subscriber profile comprising LBO service flow information from the authentication server to provide the LBO service flow information to a femto base station through establishing an initial service flow between the terminal and the femto gateway;
 the femto base station for establishing an LBO service flow through a Dynamic Service Addition (DSA) procedure;
 the terminal for performing a Dynamic Host Configuration Protocol (DHCP) procedure with the femto base station through the established LBO service flow, and obtaining a first Internet Protocol (IP) address for LBO based on the DHCP procedure,
 wherein the femto base station distributes LBO traffic of the terminal via an LBO path established between the femto base station and an Internet network through an Internet Service Provider (ISP) network using the first IP address for LBO based on the DHCP procedure, and distributes data traffic of the terminal via a data traffic path established between the femto base station and the Internet network through the ISP network and the femto gateway using a second IP address, wherein the femto base station supports a direct connection between the terminal and another terminal serviced by the femto base station without detouring via the Internet network, and wherein the terminal obtains the second IP address from a DHCP server of the femto gateway.

35. The system of claim 34, wherein the terminal performs the DHCP procedure through establishing the LBO service flow and obtains the first IP address for LBO based on the DHCP procedure, after establishing an initial service flow between the terminal and the femto base station, receives a DSA request message comprising an LBO service indicator from the femto base station, transmits a DSA response message for the DSA request message to the femto base station, and receives a DSA ACK message for the DSA response message from the femto base station, and after establishing the LBO service flow, obtains the first IP address for LBO based on the DHCP procedure.

36. The system of claim 34, wherein the femto base station establishes an LBO service flow through the DSA procedure, when receiving LBO service flow information from the femto gateway, transmits a DSA request message comprising an LBO service indicator to the terminal in order to establish the LBO service flow, after receiving a DSA response message from the terminal, transmits the DSA ACK message to the terminal, and allocates the first IP address for an LBO service to the terminal through the DHCP procedure.

37. The system of claim 34, wherein the femto gateway receives information informing that an LBO service flow has been successfully establish from the femto base station.

38. The system of claim 34, wherein the femto gateway and the femto base station are connected via a Virtual Private Network (VPN).

39. The system of claim 34, wherein during the DHCP procedure, the femto base station requests the femto gateway to start accounting for an LBO service, the femto gateway requests the authentication server to start billing, the authentication server transmits a response message for an accounting request to the femto gateway, and the femto gateway transmits a response message for an accounting request to the femto base station, and when receiving a response message for an accounting request, the femto base station transmits a DHCP ACK message to the terminal.

40. The system of claim 34, wherein after releasing the DHCP procedure, the terminal transmits a registration release request message to the femto base station, the femto base station transmits a message requesting an LBO service end to the femto gateway, and receives a response message from the femto gateway, and requests the femto gateway and the authentication server to stop billing and receives a response message.

41. The system of claim 34, wherein the LBO service indicator is defined using at least one of a separate parameter and a Service Flow IDentifier (SFID) for the LBO service indicator.

\* \* \* \* \*